US011063683B1

(12) United States Patent
Jones et al.

(10) Patent No.: US 11,063,683 B1
(45) Date of Patent: Jul. 13, 2021

(54) SCALABLE ROADM ARCHITECTURE WITH MULTI-PLANE SWITCHING (71) Applicant: Ciena Corporation, Hanover, MD (US)

(72) Inventors: Kevan Peter Jones, Ottawa (CA); Loren Berg, Richmond (CA)

(73) Assignee: Ciena Corporation, Hanover, MD (US)

(*) Notice: Subject to any disclaimer, the term of this patent is extended or adjusted under 35 U.S.C. 154(b) by 0 days.

(21) Appl. No.: 16/899,739

(22) Filed: Jun. 12, 2020

(51) Int. Cl.
*H04J 14/02* (2006.01)

(52) U.S. Cl.
CPC ........ *H04J 14/0212* (2013.01); *H04J 14/025* (2013.01); *H04J 14/0209* (2013.01); *H04J 14/0219* (2013.01)

(58) Field of Classification Search
CPC .............. H04J 14/0212; H04J 14/0209; H04J 14/0219; H04J 14/025; H04J 14/0205; H04J 14/0217; H04J 14/021; H04Q 2011/0016; H04Q 11/0005; H04Q 2011/0052; H04Q 1/145; H04L 49/101; H04L 49/1576; G02B 6/356
USPC ................ 398/83, 45, 48, 50, 51, 54, 68, 79
See application file for complete search history.

(56) References Cited

U.S. PATENT DOCUMENTS

| 6,853,763 B1* | 2/2005 | McNicol ............. H04J 14/0212 385/17 |
| 7,184,666 B1 | 2/2007 | Li et al. |
| 7,315,674 B2 | 1/2008 | Xia et al. |
| 7,424,223 B1 | 9/2008 | Lundquist et al. |
| 7,734,174 B2 | 6/2010 | Beckett et al. |
| 7,826,748 B2 | 11/2010 | Yang et al. |
| 7,899,334 B2 | 3/2011 | Zhong et al. |
| 8,131,149 B2 | 3/2012 | Zottmann |
| 8,204,374 B2 | 6/2012 | Barnard |
| 8,233,215 B2 | 7/2012 | Bao |
| 8,433,192 B2 | 4/2013 | Frankel et al. |
| 8,452,861 B2 | 5/2013 | Kapadia et al. |
| 8,457,497 B2 | 6/2013 | Zhong et al. |
| 8,509,621 B2 | 8/2013 | Boertjes et al. |
| 8,554,074 B2 | 10/2013 | Boertjes et al. |
| 8,625,994 B2 | 1/2014 | Archambault et al. |
| 8,750,706 B2 | 6/2014 | Boertjes et al. |
| 9,258,190 B2 | 2/2016 | Swinkels et al. |
| 9,270,405 B2 | 2/2016 | Blair et al. |
| 9,485,551 B2 | 11/2016 | Prakash et al. |
| 9,680,569 B2 | 6/2017 | Archambault et al. |
| 9,866,929 B2 | 1/2018 | Frankel et al. |
| 10,187,152 B2 | 1/2019 | Prakash et al. |

(Continued)

*Primary Examiner* — Hibret A Woldekidan
(74) *Attorney, Agent, or Firm* — Clements Bernard Walker; Lawrence A. Baratta, Jr.; Christopher L. Bernard (57) ABSTRACT A node configured to operate in an optical network includes P switching planes interconnected by an S×S cross-plane switch, P>1; and $N_i$ degrees per switching plane $P_i$ where i=1 to P, each degree formed by corresponding degree components having R ports, wherein a first set of ports of the R ports is for intra-plane switching, a second set of ports of the R ports is for inter-plane switching, and a third set of ports of the R ports is for in-plane add/drop. S is greater than or equal to a sum of a number of degrees across all of the P switching planes. R is greater than or equal to a sum of the first set of ports, the second set of ports, and the third set of ports.

20 Claims, 7 Drawing Sheets

(56) References Cited

U.S. PATENT DOCUMENTS

| | | |
|---|---|---|
| 10,454,609 B2 | 10/2019 | Chedore et al. |
| 10,560,212 B2 | 2/2020 | Al Sayeed et al. |
| 2009/0041457 A1* | 2/2009 | Maki ................... H04J 14/0217 398/45 |
| 2009/0097496 A1* | 4/2009 | Nakamura ....... H04N 21/23424 370/419 |
| 2009/0175620 A1 | 7/2009 | Bhatnagar et al. |
| 2010/0027995 A1 | 2/2010 | Farley et al. |
| 2010/0183311 A1 | 7/2010 | Yang et al. |
| 2013/0070617 A1 | 3/2013 | Clow et al. |
| 2014/0029948 A1 | 1/2014 | Wellbrock |
| 2014/0321853 A1* | 10/2014 | Beshai .................. H04L 49/357 398/52 |
| 2015/0188657 A1* | 7/2015 | Chiaroni ............. H04J 14/0212 398/48 |
| 2016/0134390 A1 | 5/2016 | Al Sayeed et al. |
| 2016/0344471 A1 | 11/2016 | Meng et al. |
| 2020/0007262 A1 | 1/2020 | Chedore et al. |
| 2020/0053002 A1* | 2/2020 | Heidelberger ........ H04L 49/101 |
| 2020/0119829 A1 | 4/2020 | Chedore et al. |

\* cited by examiner

SCALABLE ROADM ARCHITECTURE WITH MULTI-PLANE SWITCHING

FIELD OF THE DISCLOSURE

The present disclosure generally relates to optical networking. More particularly, the present disclosure relates to systems and methods for a scalable Reconfigurable Optical Add/Drop Multiplexer (ROADM) architecture with multi-plane switching.

BACKGROUND OF THE DISCLOSURE

In optical networks, a Reconfigurable Optical Add/Drop Multiplexer (ROADM) is a configuration, hardware equipment, etc. that can add, block, pass (express), drop, and switch channels at a wavelength (or portion of the optical spectrum) level in a Dense Wave Division Multiplexing (DWDM) system. At the network level, a ROADM node is a site in an optical network where channels are added, dropped, and/or expressed through. That is, ROADM nodes are terminal locations where traffic is accessed in an optical network. Each degree in a ROADM node includes components to support two fibers interconnected to the optical network, namely an ingress and egress fiber (transmit and receive). For example, a two-degree ROADM node has two network-facing ports (as described herein, a port can include two fibers—transmit and receive), and, generally, an W-degree node has W network-facing ports, W≥1. Each ROADM node also includes directions, and these typically have been used synonymously with the term degree, but that is not necessarily the case. For example, a four-degree ROADM node can have two-degrees facing the same directions, e.g., North, or it could have each of the four-degrees facing different directions, e.g., North, South, East, and West (N, S, E, and W). Those skilled in the art recognize the directions, N, S, E, and W, are used logically and do not necessarily denote geography.

As DWDM optical networks approach capacity limits determined by spectral efficiency, the only two dimensions by which the network capacity can increase are the wavelength/frequency domain (i.e., increasing the utilized spectrum) or the space domain (increasing the number of fibers or fiber modes) used for transmission. As network capacities increase, this requires the transition to a Space Division Multiplexing (SDM) (sometimes known as "multi-rail") architecture. As described herein, SDM refers to having multiple fiber pairs in the same direction, i.e., parallel fiber rails. This would be the scenario described above, where the four-degree ROADM node can have two-degrees facing the same directions. Note, in this manner, with SDM, degree, and direction are not necessarily equal in a ROADM node. Stated differently, a degree is required for every network-facing port, and having multiple networks facing ports in the same direction increases the number of degrees at the ROADM node, but not the number of directions.

Scaling conventional ROADM designs becomes challenging and expensive as the capacity increases, especially considering the evolution to SDM with multi-rail systems. Conventional ROADMs are built upon a fully distributed architecture and so all elements must be connected to all other elements in the node. As the capacity scales, more degrees are added and this leads to an increase in the interconnect (cabling) between devices and consequently the number of ports required on the individual devices, namely Wavelength Selective Switches (WSS). Most ROADM solutions today simply approach this problem by scaling the size of the WSS devices to provide a distributed and resilient solution. As ROADM size and capacity scale, simply scaling up the number of WSS ports in today's architectures is not sustainable from a technology or interconnect perspective. Also, with the multi-rail operation, ROADM nodes require a significantly larger number of degrees. Note, SDM increases the number of degrees, but not the number of directions. One solution to reduce the interconnect complexity and reduce the port requirements, with multi-rail networks, can be to simply treat degrees in the same direction as separate networks or planes, reducing the number of WSS ports and interconnect requirements. However, this prevents switching between planes where different fibers and paths may be selected for the resilience and efficiency of spectral routing. Thus, existing solutions drive either reduced functionality (no switching between "rails" of the network) or drive more expensive and complex large-scale integrated ROADMs Thus, there is a need to provide scalability in ROADM node architecture, especially considering ROADM node architectures where there are multi-rails, i.e., multiple degrees in the same direction.

BRIEF SUMMARY OF THE DISCLOSURE

The present disclosure relates to systems and methods for a scalable Reconfigurable Optical Add/Drop Multiplexer (ROADM) architecture with multi-plane switching. The scalable ROADM architecture includes a multiple plane approach that supports inter-plane switching while requiring significantly less interconnect. By organizing a ROADM node into planes, these can be interconnected and managed as medium size ROADM nodes are today with a full distributed passive connection architecture that is fault resilient. To provide cross-plane connectivity, the ROADM node includes a space switch that only operates on the cross-plane traffic. This allows the switch to be scaled to a smaller size (denser, lower cost, and more reliable), and the architecture allows multiple cross-plane switches to be deployed for either richer connectivity and/or resilience. This allows a much more efficient and highly scalable ROADM node to be constructed. Separating the ROADM into planes allows optimization of the capability and physical form factor within the plane. Introducing a cross-plane switching matrix provides rich connectivity at a reasonable scale, i.e., there is not a requirement to switch all traffic across the planes. This two-dimensional approach delivers reduced interconnect and simpler optical modules for enhanced capability. SDM provides the final dimension available in network scaling, and this configuration delivers ROADM scalability with reasonable constraints in the cross-plane switching capability. This solution is unique in using existing ROADM architectures by extending the scalability through a multi-plane architecture. This provides more scalable ROADM configurations with cost, density, and power considerations in mind.

In an embodiment, a node configured to operate in an optical network includes P switching planes interconnected by an S×S cross-plane switch, P>1; and $N_i$ degrees per switching plane $P_i$ where i=1 to P, each degree formed by corresponding degree components having R ports, wherein a first set of ports of the R ports is for intra-plane switching, a second set of ports of the R ports is for inter-plane switching, and a third set of ports of the R ports is for in-plane add/drop. S can be greater than or equal to a sum of a number of degrees across all of the P switching planes. R can be greater than or equal to a sum of the first set of ports, the second set of ports, and the third set of ports. The node can further include D directions, wherein at least one direction has multiple degrees, and $D \leq N_i$. The degree components can include a route and select configuration with a first 1×R Wavelength Selective Switch (WSS) and a second R×1 WSS. The degree components can include a broadcast and select configuration with an R-way splitter and a R×1 Wavelength Selective Switch (WSS). The degree components can include a route and combine configuration with a 1×R Wavelength Selective Switch (WSS) and an R-way combiner. The node can further include one or more fiber shufflers configured to interconnect the P switching planes and the $N_i$ degrees. The corresponding degree components can include at least one open port for addition of a cross-plane switch for one or more of redundancy and additional inter-plane connectivity. The addition can be performable in-service.

In another embodiment, a node configured to operate in an optical network with Space Division Multiplexing includes P switching planes interconnected by an S×S cross-plane switch, P>1; D directions, wherein at least one direction has multiple degrees, and $D \leq N_i$; and $N_i$ degrees per switching plane $P_i$ where i=1 to P, each degree formed by corresponding degree components having R ports, wherein a first set of ports of the R ports is for intra-plane switching, a second set of ports of the R ports is for inter-plane switching, and a third set of ports of the R ports is for in-plane add/drop. S can be greater than or equal to a sum of a number of degrees across all of the P switching planes. R can be greater than or equal to a sum of the first set of ports, the second set of ports, and the third set of ports. The degree components can include a route and select configuration with a first 1×R Wavelength Selective Switch (WSS) and a second R×1 WSS. The degree components can include a broadcast and select configuration with an R-way splitter and a R×1 Wavelength Selective Switch (WSS). The degree components can include a route and combine configuration with a 1×R Wavelength Selective Switch (WSS) and an R-way combiner.

In a further embodiment, a method includes connecting P switching planes with an S×S cross-plane switch, P>1; configuring $N_i$ degrees per switching plane $P_i$ where i=1 to P, each degree formed by corresponding degree components having R ports; and connecting a first set of ports of the R ports for intra-plane switching, a second set of ports of the R ports for inter-plane switching, and a third set of ports of the R ports is in-plane add/drop. S can be greater than or equal to a sum of a number of degrees across all of the P switching planes. R can be greater than or equal to a sum of the first set of ports, the second set of ports, and the third set of ports. The corresponding degree components can include at least one open port for addition of a cross-plane switch for one or more of redundancy and additional inter-plane connectivity.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, the present disclosure relates to systems and methods for a scalable ROADM architecture with multi-plane switching. The scalable ROADM architecture includes a multiple plane approach that supports inter-plane switching while requiring significantly less interconnect. By organizing a ROADM node into planes, these can be interconnected and managed as medium size ROADM nodes are today with a full distributed passive connection architecture that is fault resilient. To provide cross-plane connectivity, the ROADM node includes a space switch that only operates on the cross-plane traffic. This allows the switch to be scaled to a smaller size (denser, lower cost, and more reliable), and the architecture allows multiple cross-plane switches to be deployed for either richer connectivity and/or resilience. This allows a much more efficient and highly scalable ROADM node to be constructed. Separating the ROADM into planes allows optimization of the capability and physical form factor within the plane. Introducing a cross-plane switching matrix provides rich connectivity at a reasonable scale, i.e., there is not a requirement to switch all traffic across the planes. This two-dimensional approach delivers reduced interconnect and simpler optical modules for enhanced capability. SDM provides the final dimension available in network scaling, and this configuration delivers ROADM scalability with reasonable constraints in the cross-plane switching capability. This solution is unique in using existing ROADM architectures by extending the scalability through a multi-plane architecture. This provides more scalable ROADM configurations with cost, density, and power considerations in mind.

Wavelength Selective Switch (WSS)

Figure 1:
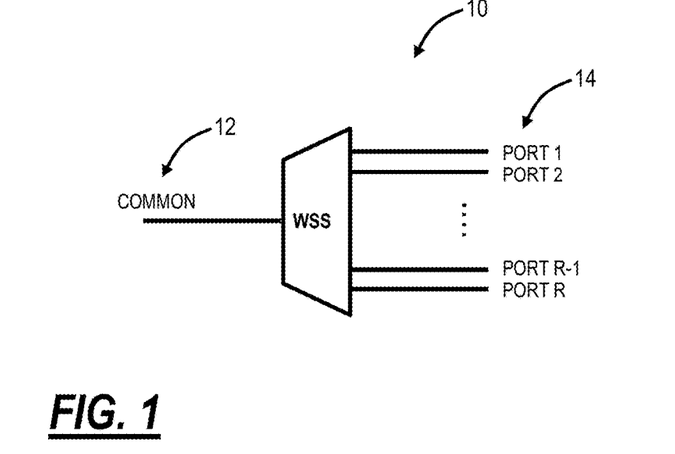
FIG. 1 is a block diagram of a Wavelength Selective Switch (WSS) that can be used as part of a ROADM architecture.

FIG. 1 is a block diagram of a Wavelength Selective Switch (WSS) 10 that can be used as part of a ROADM architecture. In an embodiment, ROADM nodes are constructed with multi-port WSS's 10. Various physical, hardware implementations are possible for the WSS 10, all of which are contemplated herein. Generally, the WSS 10 is quoted as a 1×R device where the 1 represents a common port 12, and the R represents switch ports 14. Note, the WSS 10 can also go in either direction, i.e., the common port 12 can receive channels at an input of a degree or transmit channels at an output of a degree. The WSS 10 is such that channels or optical spectrum (depending on whether the ROADM node is a fixed grid and/or flexible grid) can be arbitrarily routed between the common port 12 and the switch ports 14. The WSS 10 provides programmable routing in both the wavelength (optical frequency) and space domains. That is, the wavelengths routed between the common port and to a switch port 14 are software programmable in an arbitrary way, For example, $\lambda_1$ is routed in the wavelength domain to port 1, and $\lambda_2$ is routed in the wavelength domain to port 2. Since $\lambda_1$ and $\lambda_2$ are on different ports, they have also been routed in the space domain, but programmable with wavelength granularity. Again, the WSS 10 can be used in both directions, either as a multiplexer or demultiplexer device. Conventional WSS 10 devices typically include a scale of 2 to 32 for R, and higher port counts have been proposed and demonstrated. For example, the WSS 10 devices are typically 1×9, 1×20, 1×32, etc. R=9 counts are suitable for small degree systems, e.g., 4-6 degrees while R=20 and R=32 can accomodate 8 and even 16 degree node. As mentioned herein, the push to SDM can double, triple, or more the degree counts. While there is a push to scale R beyond 32, this has its disadvantages as described herein. Of course, higher values of R require performance decreases in the optical domain.

ROADM Node

Figure 2:
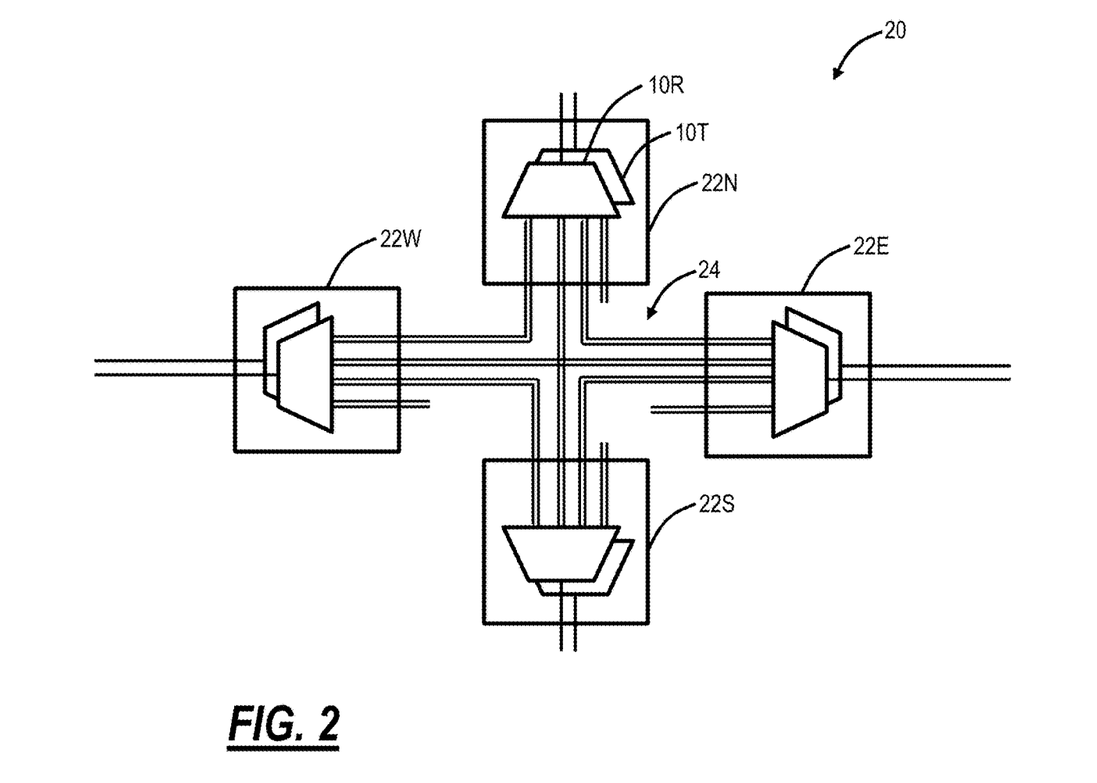
FIG. 2 is a block diagram of a ROADM node with four example degrees.

FIG. 2 is a block diagram of a ROADM node 20 with four example degrees 22 (labeled 22N, 22S, 22E, 22W). Again, those skilled in the art recognize the directions, N, S, E, and W, are used logically and do not necessarily denote geography. The ROADM node 20 is a central piece of an optical network providing the ability to add/drop/express connections (i.e., wavelengths, channels, optical spectrum, etc.). In an implementation, the ROADM node 20 is formed when a number of WSS 10 modules are interconnected together to create wavelength assignable switching to multiple optical degrees 22. The WSS 10 modules are shown as a WSS 10R for receiving and a WSS 10T for transmitting in each degree 22, namely, a degree 22 requires two WSS 10 devices, one each for ingress and egress from the ROADM node 20. Also, there are various different architectures for forming the degree side with the WSS 10, including Route and Select (R&S), Broadcast and Select (B&S), and Route & Combine (R&C). All of these and other techniques are contemplated herein. R&S includes the two WSS 10R, 10T, namely a WSS 10 for both the ingress and egress side of the degree 22. B&S utilizes a 1×R splitter on the ingress side and a WSS 10T on the egress side. Here, the 1×R splitter broadcasts the received spectrum to all switch ports 14, and the WSS 10T selects accordingly, hence the name B&S. The R&C is the opposite of the B&S, having the WSS 10R on the ingress and an R×1 combiner on the egress side. The objective of the B&S and R&C in the past was to reduce the number of WSS 10, but the R&S configuration has become the preferred implementation due to the lower optical losses incurred when switching between a moderate number of degrees.

The following descriptions are presented with reference to the Route and Select approach where each degree of the ROADM node 20 includes two WSSs 10R, 10T. Those skilled in the art will recognize the systems and methods described herein can also apply to other approaches, such as Broadcast and Select and Route and Combine. Also, those skilled in the art will recognize the FIGS. presented herein omit various components for ease of illustration. That is, a degree in the Route and Select approach can also include multiplexers, demultiplexers, amplifiers, Optical Service Channels (OSC), Optical Channel Monitors (OCM), and the like.

In the example of FIG. 2, the ROADM node 20 includes four degrees (N=4) 22N, 22S, 22E, 22W, which equals the number of directions (D=4), namely four—N, S, E, W. In FIG. 2, the ROADM node 20 includes a distributed connection model 24 for interconnection whereby there is no centralized path switching, but all degrees 22 are connected to all other degrees 22. This distributed connection model 24 avoids a single point of failure creating a resilient structure. For an N degree configuration, connections are required to N−1 degrees resulting in N*(N−1) interconnections. Here, in FIG. 2, with four degrees, there is a need for 4*(4−1) or 12 connections in the distributed connection model 24. Thus, in FIG. 2, the WSS 10T, 10R requires 3 ports for degree interconnect (N−1) The remaining ports (A) are assigned as local add/drop ports and may be used directly or connected to further levels of multiplexing/demultiplexing. Thus each degree is serviced by (N−1)+A ports where the ports are duplex connections containing both an ingress and egress.

Where the scale (number of degrees 22 supported) of the ROADM node 20 is moderate, this interconnection complexity in the distributed connection model 24 is manageable. However, as the scale increases, the number of degree 22 interconnects increases quickly. As shown in FIG. 2, the four-degree ROADM node 20 requires 12 interconnections, while an eight-degree ROADM node 20 would need 56 interconnections, and a twelve-degree ROADM node 20 would need 132 interconnections. In physical implementations, the distributed connection model 24 is often simplified through the deployment of multi-fiber cables and "fiber shuffle" devices to create the static connectivity that is required while minimizing the number of physical connections. However, the number of ports on the WSS 10 must also scale proportionally to support the degree interconnect and associated add/drop.

Space Division Multiplexing (SDM)

Figure 3:
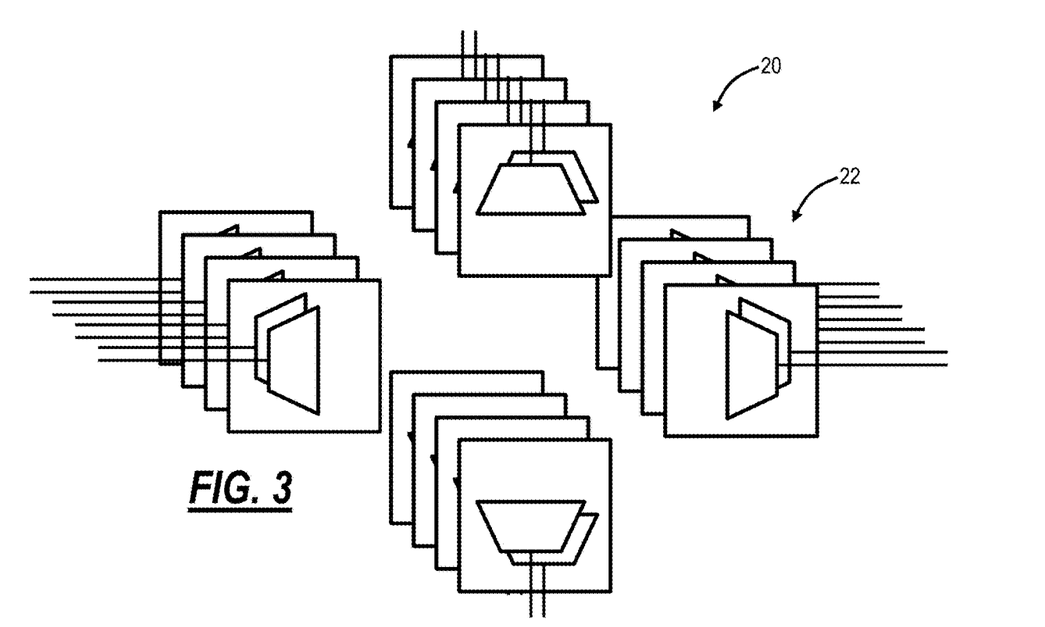
FIG. 3 is a block diagram of the ROADM node with four degrees per direction in a Space Division Multiplexing (SDM) configuration.

Again, as network capacities scale, an option is to increase the network capacity by using SDM. In its simplest form, this adds additional parallel fiber paths to the network, but this also increases the number of degrees that are required to be supported. That is, SDM increases the number of degrees 22 while the number of directions remains the same. FIG. 3 is a block diagram of the ROADM node 20 with four degrees per direction in an SDM configuration. FIG. 3 is the equivalent of a 16-degree node, requiring interconnections. Also, for an eight direction node with four fiber rails, there would be 32 degrees requiring 992 interconnections for the degrees alone. This rapidly becomes impractical from both an interconnect and WSS device scale.

Scaling Multi-Degree ROADM Nodes into Multi-Plane Switching

The present disclosure proposes a new ROADM architecture that provides a highly scalable solution while retaining many of the existing ROADM advantages. This is achieved by slicing the ROADM node 20 into switching planes 40 using the current wavelength and space switching of the WSS 10 and providing an additional cross-plane (Xplane) switch 50 to allow connectivity between the planes 40. Furthermore, the degree of cross-plane switch 50 is also scalable based upon application and to allow for 1 for X redundancy in the cross-plane switch 50. This novel ROADM architecture provides for a highly scalable solution that is configurable to the application while minimizing the interconnect and WSS port scale requirements.

Figure 4:
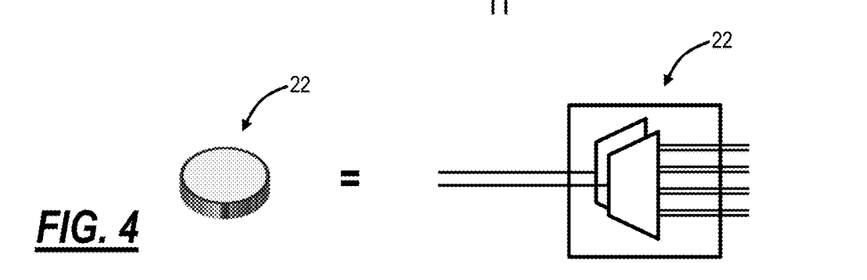
FIG. 4 is a block diagram illustrating that a degree in FIGS. 5-9 is illustrated as a simple oval or cylindrical shape for ease of illustration.

FIG. 4 is a block diagram illustrating that a degree 22 in FIGS. 5-9 is illustrated as a simple oval or cylindrical shape for ease of illustration. That is an oval or cylindrical shape in FIGS. 5-9 is used to represent all components of the degree 22, e.g., two WSSs 10T, 10R and associated amplification and other components.

Figure 5:
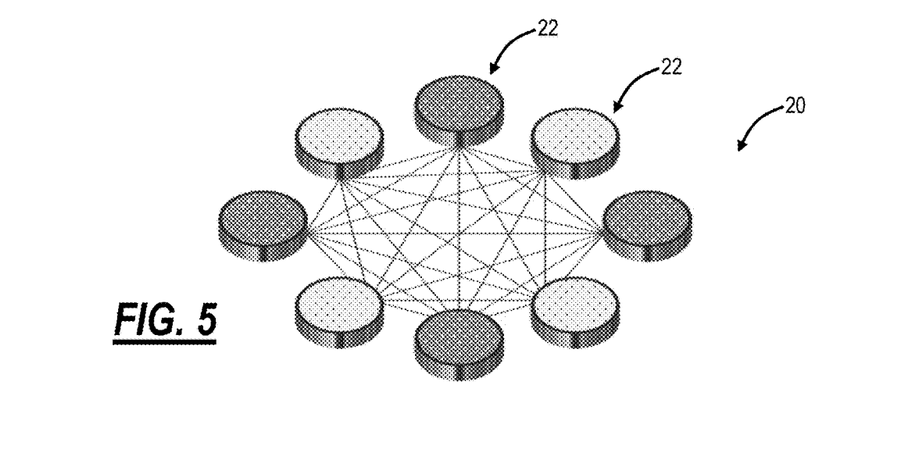
FIG. 5 is a block diagram of a ROADM node with eight degrees with full interconnect between every degree.

FIG. 5 is a block diagram of a ROADM node 20 with eight degrees 22 with full interconnect between every degree 22. Of note, the representation of the ROADM node 20 in FIG. 5 is a single plane. Further, the ROADM node 20 of FIG. 5 can include eight directions supported by 8 degrees 22. However, the ROADM node 20 of FIG. 5 could also be four directions with two rails in each direction for a total of 8 degrees 22. Other combinations are also possible.

Figure 6:
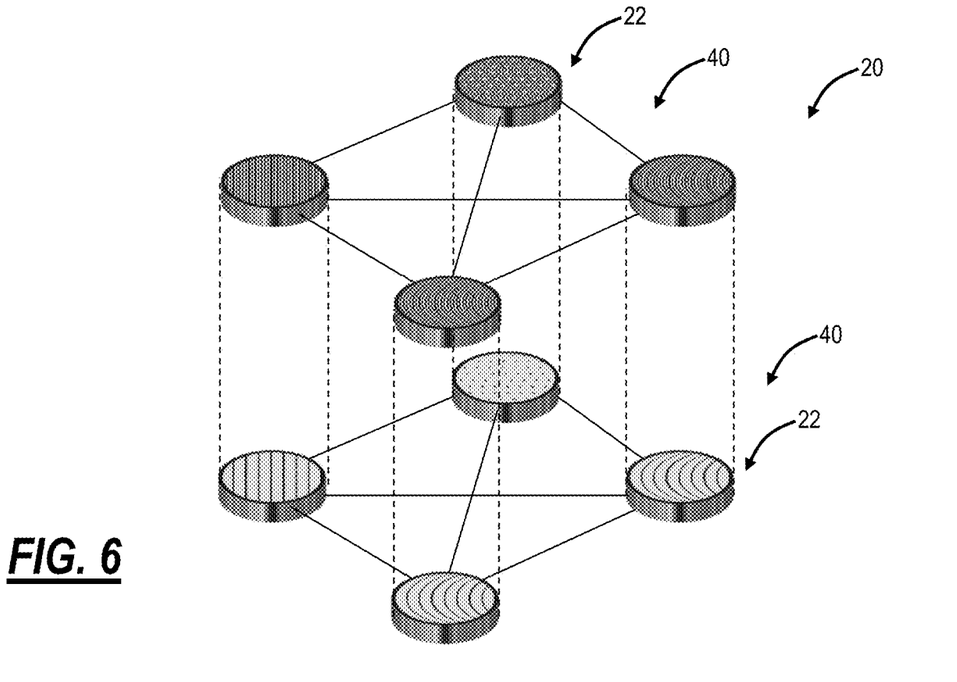
FIG. 6 is a block diagram of a ROADM node the same eight degrees as in FIG. 6 but in a multi-plane configuration with two planes.

FIG. 6 is a block diagram of a ROADM node 20 with the same eight degrees 22 as in FIG. 5 but in a multi-plane configuration with two planes 40. Note, each degree 22 in the same plane 40 is connected to one another, but the planes 40 are not connected to one another. Thus, splitting into planes 40 reduces the interconnect between the degrees 22, thereby reducing the ports required on the WSS 10, but this reduces the possible connectivity. Here, in FIG. 6, a two-plane 40 four-direction ROADM node 20 supports two rails, i.e., eight degrees, but each WSS 10 only has to interconnect within plane. Accordingly, the multi-plane 40 approach does reduce the interconnect complexity at the expense of connectivity between planes 40.

Again, SDM can be referred to as a multi-rail operation of networks on multiple fibers and can be achieved with independent ROADM planes in overlay networks. This reduces the advantage of an integrated ROADM network where different fibers and paths may be selected for the resilience and efficiency of spectral routing.

However, in the SDM context, interconnectivity between planes 40 is not a major requirement. Stated differently, there is not a need to support full degree-to-degree interconnectivity between planes 40. This is due to the nature of optical networks. Specifically, in the N direction, for example, there is not going to be major service requirements to transit a connection from one N degree 22 to another N degree 22 on separate fiber rails. That is, service connectivity, i.e., A-Z path, usually includes add/drop at a ROADM node 20 or express from one direction to another direction at the ROADM node 20. A typical A-Z path does not hairpin, or come in from one direction and leave the ROADM node 20 via the same direction.

Figure 7:
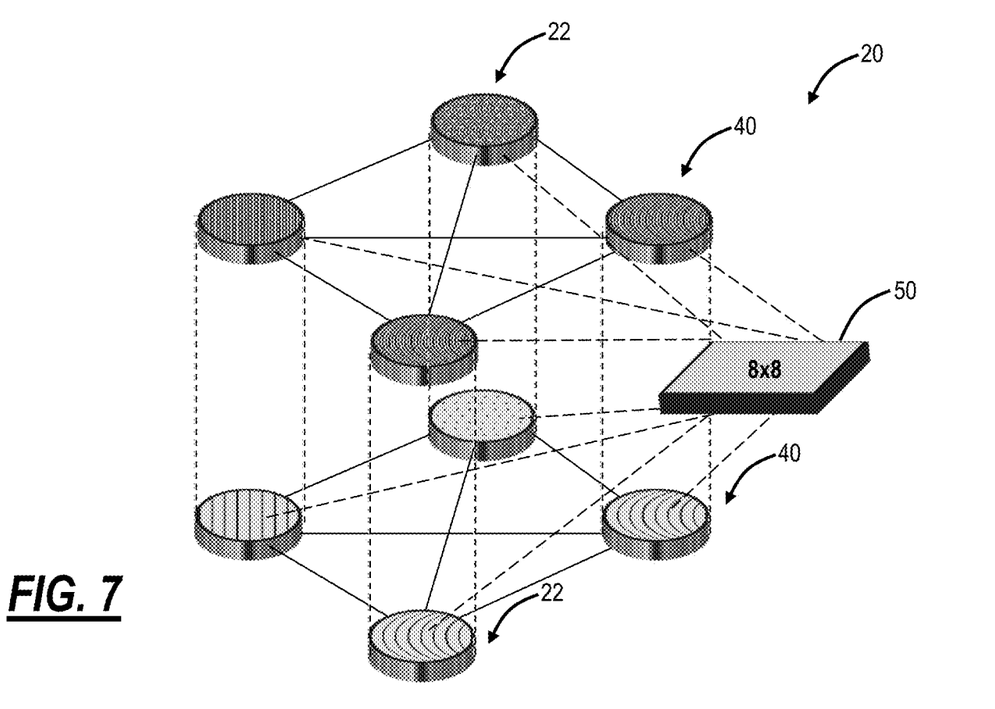
FIG. 7 is a block diagram of a ROADM node with eight degrees, four directions, and two planes, with a single 8×8 cross-plane switch for interplane connectivity.
Figure 8:
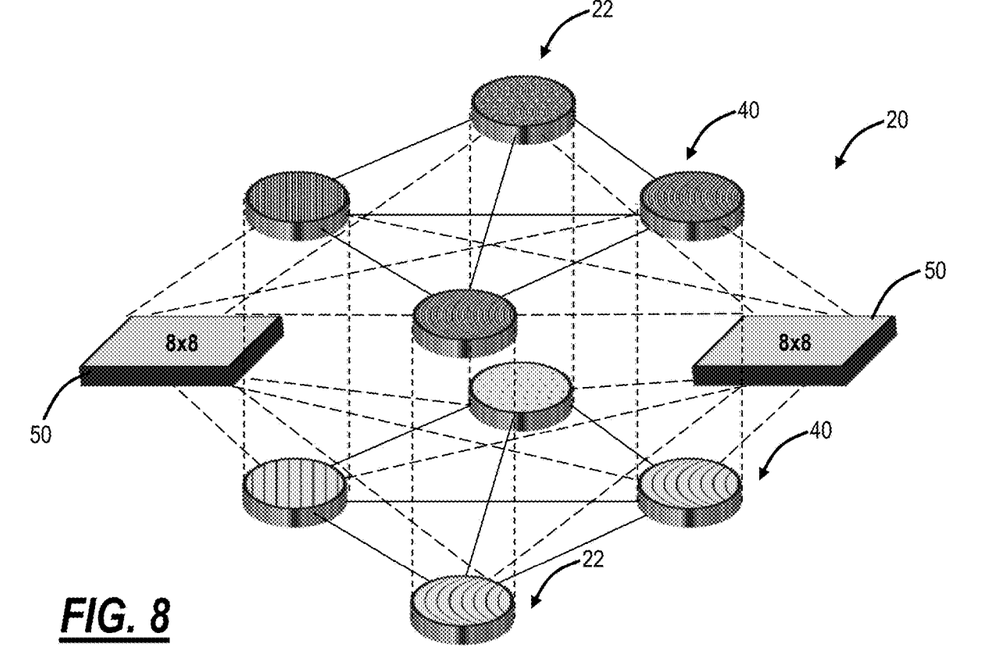
FIG. 8 is a block diagram of a ROADM node with eight degrees, four directions, and two planes, with a two 8×8 cross-plane switches for interplane connectivity (more than the single cross-plane switch in FIG. 7) and redundancy.

With this aspect in mind, the present disclosure solves the lack of interconnectivity between planes 40 utilizing the cross-plane switch 50. FIG. 7 is a block diagram of a ROADM node 20 with eight degrees 22, four directions (D), and two planes (P) 40, with a single 8×8 cross-plane switch 50 for interplane connectivity. FIG. 8 is a block diagram of a ROADM node 20 with eight degrees 22, four directions, and two planes 40, with two 8×8 cross-plane switches 50 for interplane connectivity (more than the single cross-plane switch 50 in FIG. 7) and for redundancy. The cross-plane switch 50 is an S×S switch where all channels, wavelengths, optical spectrum, etc. presented on a port is provided to another port. Thus, the cross-plane switch 50 is a cross-connect at a port level, not at a wavelength or channel level. The cross-plane switch 50 must be at least S×S, where S is the sum of the directions D over the number of planes P (D×P). In the example of FIGS. 7 and 8, there are 8 degrees 22, so the cross-plane switch 50 is at least 8×8.

Advantageously, each cross-plane switch 50 only takes up one port per WSS 10T, 10R. This is a significantly lower interconnect cost between the planes 40 versus the full interconnect model, i.e., one port per cross-plane switch 50 versus significantly more ports for full interconnect. The cross-plane switch 50 creates a hybrid structure that uses the WSS 10 based switching with a plane 40 for standard switching, add/drop, express, etc. and the cross-plane switch 50 is used for traffic moving between the planes 40. Again, the traffic moving between the planes 40 is expected to be reduced. The benefit with the cross-plane switch 50 is a significant reduction in the port count to support plane to plane interconnect. The cost of this reduction is partial blocking and the fact the cross-plane switch 50 does not support full wavelength interconnect. However, this cost is minimal and can be planned or engineered around.

In FIG. 8, an additional cross-plane switch 50 is deployed, which takes up a second port on each WSS 10T, 10R. Again, this is a single port, and it is possible to add multiple cross-plane switches 50 as needed for plane connectivity, redundancy, etc. A single port at a time to add an extra cross-plane switch 50 is minimal compared to the excessive port count for a full plane interconnect, as described herein. The second cross-plane switch 50 also supports redundancy in the cross-plane switching function as well as scaling.

With appropriate network wavelength assignment and routing algorithms, the amount of cross-plane switching can be minimized, allowing for reduced connectivity (compared to the conventional ROADM) without network blocking. This is particularly valuable as networks scale to much bigger ROADM nodes 20 as this recognizes that most of the degree interconnect is never used, but must be present to allow full programmability. By adding the programmable cross-plane switch 50, this approach retains the flexibility with simplified connectivity.

Separating the ROADM node 20 into planes 40 allows optimization of the capability and physical form factor within the plane 40. Introducing the cross-plane switch 50 provides rich connectivity at a reasonable scale. This two-dimensional approach delivers reduced interconnect and simpler optical modules for enhanced capability. SDM provides the final dimension available in network scaling, and this configuration delivers ROADM scalability with reasonable constraints. This solution is unique in using existing ROADM strategies but extending the scalability through a multi-plane (with cross-plane switching) architecture. This allows operators and vendors to provide more scalable ROADM solutions and further cost, density, and power optimizations. With this new architecture, network optimization can be addressed with cross-plane traffic paths for greater scaling of network connectivity with reduced size and cost WSS devices. That is, 1×20, 1×32 WSS 10 are possible to support large degree 22 configurations, as opposed to 1×80 or 1×96 WSS 10 or larger.

Figure 9:
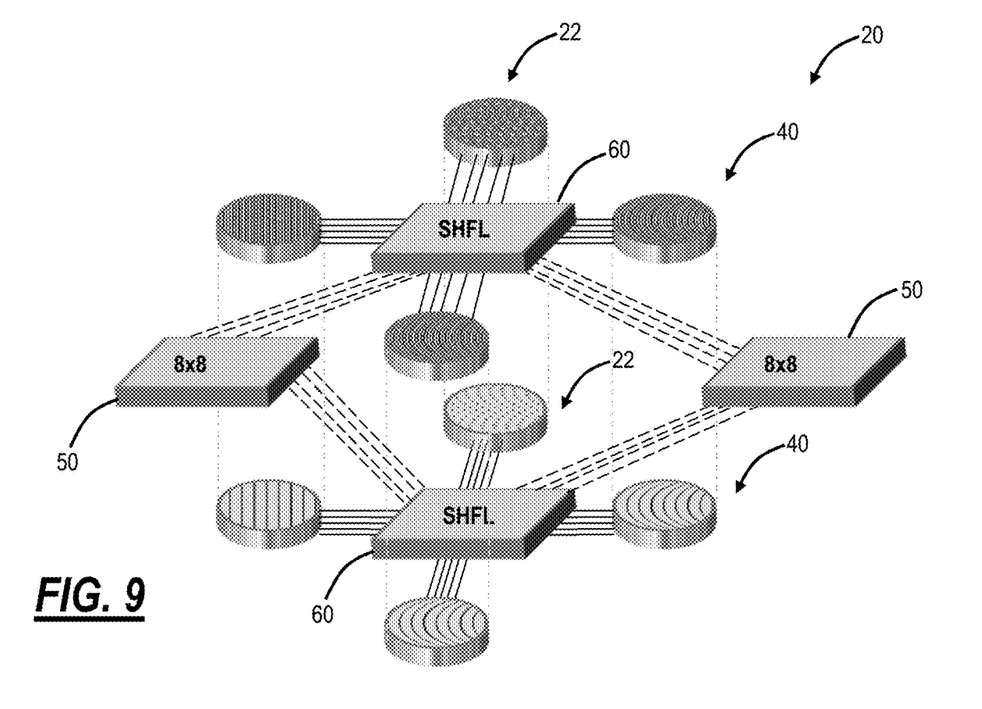
FIG. 9 is a block diagram of a ROADM node similar to the ROADM node in FIG. 8 with the addition of a fiber shuffler in each plane.

FIG. 9 is a block diagram of a ROADM node 20 similar to the ROADM node 20 in FIG. 8 with the addition of a fiber shuffler 60 in each plane 40. Fiber shufflers 60 are hardware modules that include ports and internal wiring (cabling) to support connectivity efficiently (as opposed to a bunch of cables point-to-point). This is a cabling strategy for operational efficiency. Existing ROADM nodes 20 include fiber shufflers 60, and, in FIG. 9, the connectivity between the degrees 22 in each plane 40 and the cross-plane switch 50 can be integrated into the fiber shufflers 60. In some implementations, the fiber shufflers 60 are referred to as fiber interconnect modules or cards.

Cross-Plane Switch Scale

Figure 10:
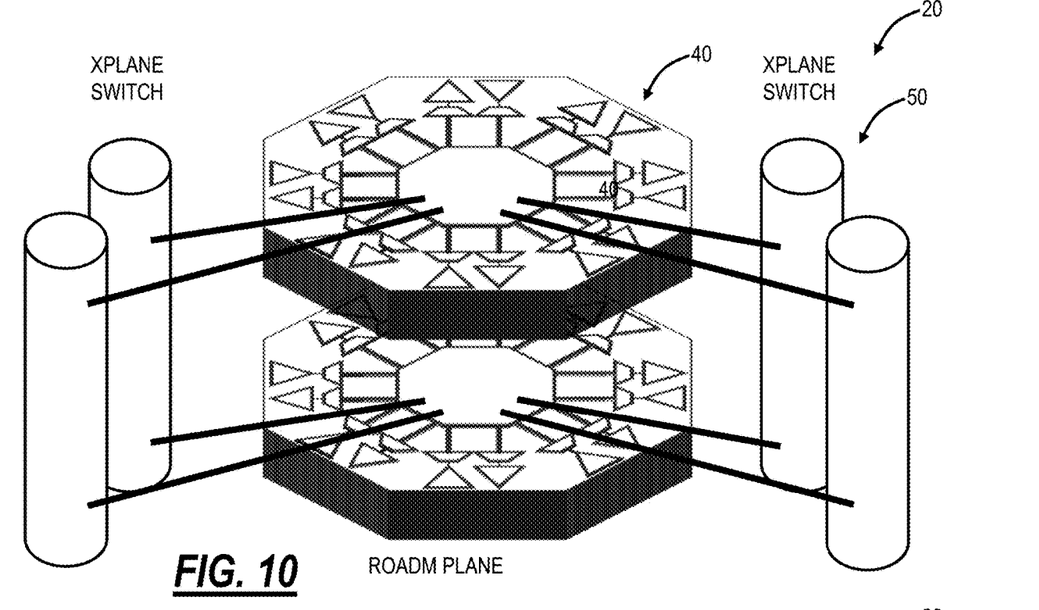
FIG. 10 is a block diagram of a ROADM node with two planes and with four cross-plane switches.
Figure 11:
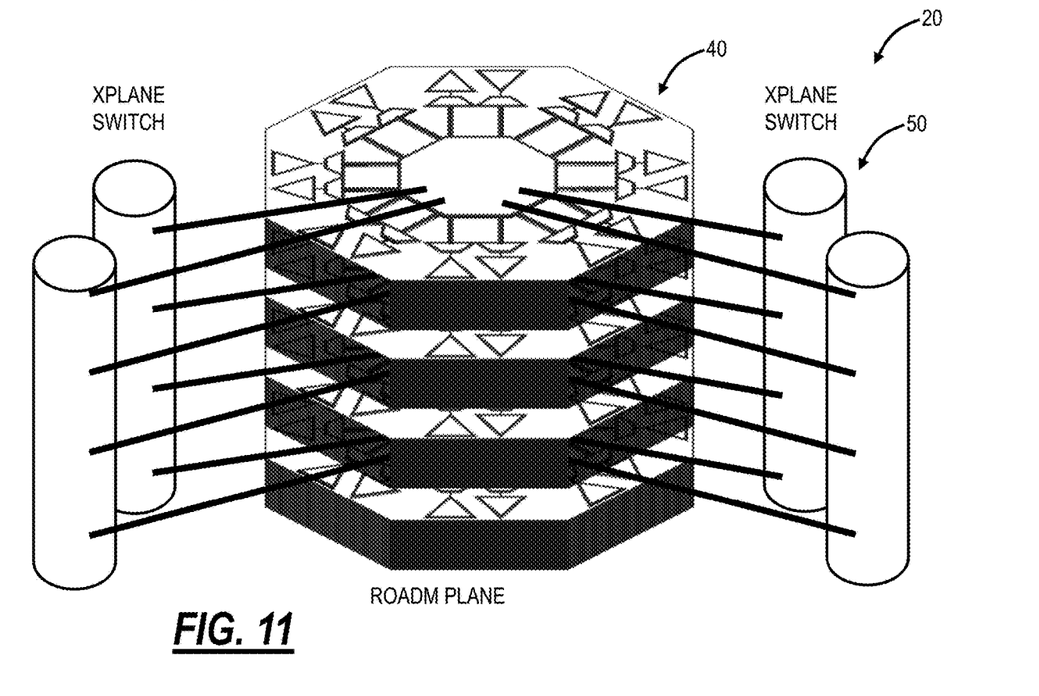
FIG. 11 is a block diagram of a ROADM node with four planes and with four cross-plane switches.

FIG. 10 is a block diagram of a ROADM node 20 with two planes 40 and with four cross-plane switches 50. FIG. 11 is a block diagram of a ROADM node 20 with four planes 40 and with four cross-plane switches 50. This multi-plane approach uses a conventional ROADM "plane" scaled to the number of directions that need to be supported in the network and scaled in the multi-rail dimension via stacked planes 40. The introduction of a cross-plane (Xplane) switching mechanism allows for richer connectivity and the ability to transition between planes 40 in the optical network. The cross-plane switch 50 is also scalable to provide different amounts of cross-plane connectivity and (if required) 1 for X redundancy in that switching matrix.

In terms of counts, assume the ROADM node 20 includes N degrees in each plane 40, A ports of add/drop is supported within each plane, P planes are supported, and X cross-plane switch 50 connections are supported. In each WSS 10, N−1 switch ports 14 are required for degree-to-degree connectivity within the plane 40, A switch ports 14 are allocated for Colorless, Directionless, and Contentionless (CDC) add/drop, and X switch ports 14 are allocated for connectivity to the cross-plane switches 50. In many applications this is CDC, but other forms of Add/Drop are supported on the A switch ports 14 including fixed wavelength add/drop, colorless directionless, and simple colorless.

For example, for an eight degree ROADM plane 40 (N=8) in FIGS. 10 and 11, there is a requirement for N−1=7 switch ports 14 for degree-to-degree connectivity within the plane 40, A=8 switch ports 14 for CDC, and X=4 switch ports for connectivity to the cross-plane switches 50, for a total of 19 ports which could be realized by a standard 1×20 WSS 10 with an extra port 14 for CDC or cross-plane switch 50 redundancy. The cross-plane switch 50 scale for N degrees per plane 40 and P planes supports is (N*P)×(N*P). For the eight degree ROADM plane 40 (N=8) in FIGS. 10 and 11, with four planes 40 allowed total; the cross-plane switch 50 should be 32×32, although it is possible to use a smaller switch with reduced connectivity.

Again, the cross-plane switch 50 scales to (N*P)×(N*P) where N is the number of degrees and P is the number of planes 40. For example, assuming the eight-degree ROADM plane 40 in FIGS. 10 and 11, the cross-plane switch 50 scales as follows:

| Planes | Switch size |
| --- | --- |
| 2 planes | 16 × 16 |
| 3 planes | 24 × 24 |
| 4 planes | 32 × 32 |
| 6 planes | 48 × 48 |
| 8 planes | 64 × 64 |
| 10 planes | 80 × 80 |
| 16 planes | 128 × 128 |
| P planes | 8P × 8P |

First, the cross-plane switch 50 sizes are reasonable and practical in terms of implementation. That is, a 128×128 cross-plane switch 50 is readily available. Second, initial deployments are not expected to start with 8, 10, or 16 planes 40. An advantage of the cross-plane switch 50 is that it supports in-service upgrades to a larger capacity. This is the opposite of conventional ROADM, which requires initial deployment with large enough WSS to meet the number of interconnects needed. With the cross-plane switch 50, as long as there are open ports on the degrees 22, it is possible to upgrade, i.e., add additional cross-plane switches 50 to the ROADM node 20.

Example Implementations

By separating the ROADM node 20 into several planes 40, several options can be deployed in each plane 40, such as a large modular, scalable ROADM plane, a highly integrated consolidated multi-degree ROADM plane ("plane on a blade"), a space switching only plane (e.g., programmable Inline Amplifier (ILA) rather than wavelength switching), etc. Each plane 40 can provide different characteristics in terms of density, Signal-to-Noise Ratio (SNR), cost, shared risk, etc., and an optimized path through the network can be selected, via the cross-plane switch 50, based upon the requirements of the service. This modular architecture allows greater scale and configurability than conventional structures.

Figure 12:
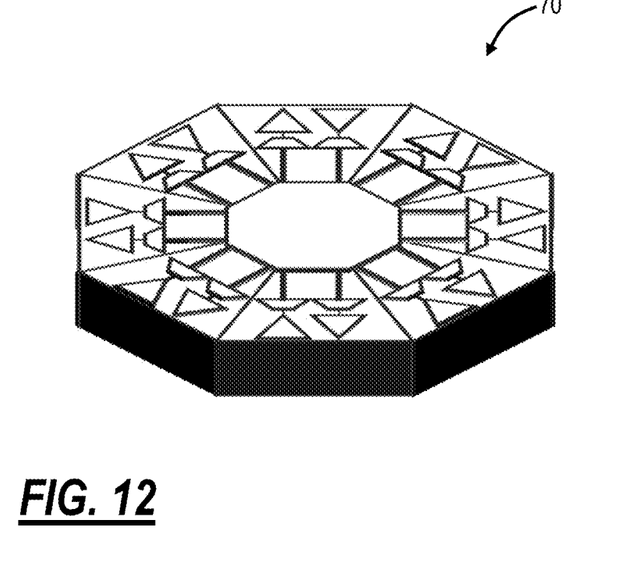
FIG. 12 is a block diagram of an example implementation of a high scale modular ROADM device.
Figure 13:
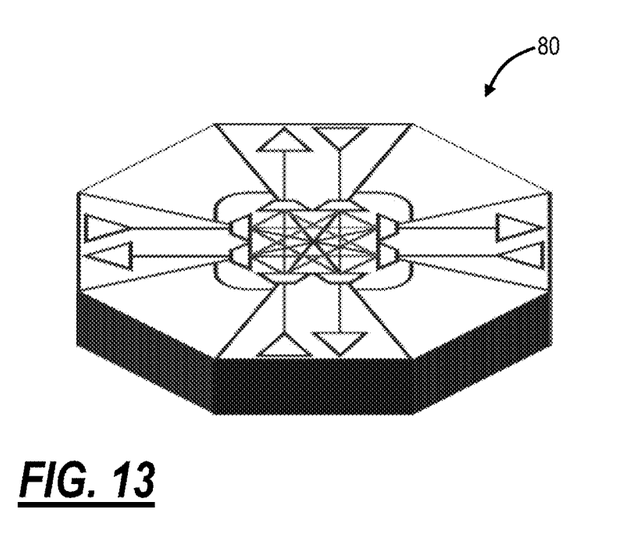
FIG. 13 is a block diagram of an example implementation of an integrated plane on a blade.

FIG. 12 is a block diagram of an example implementation of a high scale modular ROADM device 70. FIG. 13 is a block diagram of an example implementation of an integrated plane on a blade 80. That is, various possible implementations can include combining the functionality of the WSS 10 with the cross-plane switches 50, fiber shufflers 60, etc. to physically form the ROADM node 20. FIGS. 12 and 13 are examples showing WSS switching devices capable of switching in the wavelength and space domains. Also, reconfigurable by-pass amplifiers can be created using space switches in place of the WSS for a reduction in losses, providing an opportunity for single stage amplification for improved SNR and cost in some configurations.

Examples of Scaling by Numbers within a Plane

Again, one advantage of the ROADM node 20 described herein is that it is fully realizable with existing hardware and current technology. That is, the ROADM node 20 can support a significant number of degrees, directions, multi-rail fibers, etc. without the need for technology leaps in WSS port count or without the need for intermediate switches for interconnecting complexity reduction. Also, the existing hardware and current technology can be used in a modular approach. That is, the ROADM node 20 does not require a full complement of equipment initially and can be built out over time as the demand scales.

For an example large ROADM node assume eight directions and assume it is implemented using a 1×32 WSS module and an 8×24 channel add/drop module. Here, the 1×32 WSS module is a module that is configured to form a degree 22. In an embodiment, the 1×32 WSS module can include twin 1×32 flexible grid WSSs 10, dual-line optical amplifiers, bi-directional Optical Time Domain Reflectometer (OTDR), integrated Amplified Spontaneous Emission (ASE) source for channel loading, optical channel monitoring, Optical Service Channel (OSC) for high port count ROADM applications, etc. That is, the 1×32 WSS module forms a single degree 22, both ingress and egress. This module uses a 1×32 WSS 10, one common port 12, and 32 switch ports 14. The 8×24 channel add/drop module is configured to provide 24 add/drop channels to any of 8 degrees 22. The 8×24 channel add/drop module can be realized with twin contentionless WSSs.

For supporting the eight degrees, seven ports of the 1×32 WSS module are used for intra-plane switching, i.e., a number of degrees N−1. Assume there are four planes 40, then five ports of the 1×32 WSS module can be used for cross-plane switching, but it could be as low as one, for example four active cross-plane switches 50 and one protection path. This leaves 32−12=20 ports on the 1×32 WSS module for CDC, i.e., add/drop at the ROADM node 20. With the 24 ports on the 8×24 channel add/drop module, this provides the ability to add/drop 20*24=480 channels, or 60 channels per direction (480/8 directions). This equates to 93% fill @ 75 GHz and 143% fill @ 112.5 GHz. Further, this configuration may also be realized with a 1×20 WSS module with ROADM nodes 20 with smaller add/drop requirements, namely 8*24=192 channels →24 channels/direction (192/8 directions), etc.

For an example small ROADM node, there can be a fully integrated plane on a blade (module). For example, a four-degree ROADM plane can be implemented using four 1×9 WSS R&S with three ports for intra plane switching, three ports (2+1) for cross-plane switching, but it could be as low as one, and whatever is left over ports for CDC (add/drop).

Definitions—Nodal, ROADM, and Cross-Plane Switch

Based on the description herein, the following variables can be used for quantifying the architecture of the ROADM node 20. The number of switching planes 40 can be referred to as P, P>1 (note, where P=1, there is no SDM or multi-plane switching), and where P is identified via an index i, $P_i$, where i=1, 2, . . . . The directions can be referred to as D, D≥1, and each direction can have a same index i as $P_i$, i.e., $D_i$. N is for the degrees 22 and $N_i$ is maximum degrees supported per $P_i$, and $M_i$ is deployed degrees per $P_i$.

The variable R can refer to the number of switching ROADM ports on the WSS 10, i.e., R ports–1×32 R&S ROADM, R=32. Here, $N_i$−1 ports of R are for intra-plane switching, $X_1$ ports of R are for X-plane switching, and $A_i$ ports of R are for in-plane add/drop, This assumes symmetrical add/drop, e.g., CDC in-plane, but that is not necessary. Thus, typically R=($N_i$−1)+$X_i$+$A_i$ but R≥($N_i$−1)+$X_i$+$A_i$.

The cross-plane switch 50 is an S port switch providing S×S non-blocking switching where S≥Σ($N_i$) over P planes. For example, the cross-plane switch 50 can be configured with all ingress ports on one side connected to all egress ports on the other side. The number of cross-plane switches 50 is less than or equal to the Max($X_i$). Also, the term ports as used herein is duplex, i.e., both ingress and egress.

Architecture—Nodal

The following applies to the nodal architecture of the ROADM node 20. First, the number of planes P supported must be greater than 1. The number of directions $D_i$ in each plane $P_i$ shall be greater than or equal to 1. Also, the number of directions supported does not need to be the same in all planes.

The number of directions $D_i$ must be less than or equal to $N_i$. That is, there cannot be more directions supported in a plane than the maximum number of degrees supported.

The maximum number of degrees $N_i$ is not related to $N_j$. That is, the maximum number of degrees per plane is independent between the planes.

The number deployed degrees is 1≤$M_i$≤$N_i$ in plane $P_i$. That is, the number of deployed degrees within a plane can vary from 1 to the maximum number supported.

The number of deployed degrees $M_i$ is not related to $M_j$. That is, the number of deployed degrees per plane is independent between the planes.

The number of ROADM ports per degree for cross-plane switching is $X_i$≥1. If zero, then there is no ability to participate in multi-dimensional switching, i.e., this is just an isolated system. $X_i$ is independent of $X_j$: different planes may have different inter-plane connectivity.

The number of cross-plane switches is less than or equal to Max($X_1$). The maximum inter-plane switching capacity is determined by most capable plane.

Architecture—ROADM and WSS

The number of switching ports at the ROADM is R. Again, this may be achieved with different configurations—Broadcast & Select with an R-way splitter and an R×1 WSS, Route & Select with a 1×R WSS and a R×1 WSS, and a Route & Combine with a 1×R WSS and a R-way combiner. Collectively, the R-way splitter, the R×1 WSS, the 1×R WSS, and the R-way combiner can be referred to as degree components.

A subset of R ports ($N_i$−1) is used for intra-plane switching. A subset of R ports ($X_i$) is used for inter-plane switching (cross-plane). A subset of R ports ($A_i$) is used for intra-plane add/drop. A symmetrical add/drop for each degree is assumed for simplicity, but this is not a requirement. Different degrees can support different symmetrical or asymmetrical add/drop structures.

Typically R=($N_i$−1)+$X_i$+$A_i$, but in most systems R is determined in advance and A is the point of most flexibility so . . . $A_i$=R−($N_i$−1)−$X_1$. For example, with a 32 port ROADM (using, e.g., Twin 1×32 WSS in a R&S configuration), there can be $N_i$=12 degrees, $X_i$=5 (4 inter-plane switches+spare) → $A_i$=16 ports available for local add/drop.

Architecture—Cross-Plane Switch

The scale of the inter-plane switch S is determined by the interconnect required. Typically this should be scaled for the maximum number of degrees supported in each plane such that S≥Σ($N_i$) over all planes. The absolute minimum is that the inter-plane switch can connect to all the deployed degrees so that S≥Σ($M_i$) over all planes. If this is not true, then those un-connected elements are not participating in the multi-dimensional switching. Of course, it is possible that not all degrees 22 are connected or participating in the inter-plane switching. This approach can be referred to as thin inter-plane switching, e.g., only degrees 22 that need such connectivity are connected. This approach is also contemplated herein, and the value of S may be lowers than Σ($N_i$) over all planes or Σ($M_i$) over all planes.

For example, a four-plane node with uniform eight maximum degrees per plane would require . . . S port switch of (4×8)=32. So a 32×32 fiber switch would be required (32 ingress fibers, 32 egress fibers for 32 duplex ports). In another example, a four plane node with one 12 maximum degrees per plane, one 8 maximum degrees per plane and two 4 maximum degrees per plane would require . . . S port switch of (12+8+4+4)=28. So a 28×28 fiber switch would be required (28 ingress fibers, 28 egress fibers for 28 duplex ports).

Node

In an embodiment, a node configured to operate in an optical network includes P switching planes interconnected by an S×S cross-plane switch, P>1; and $N_i$ degrees per switching plane $P_i$ where i=1 to P, each degree formed by corresponding degree components having R ports, wherein a first set of ports of the R ports is for intra-plane switching, a second set of ports of the R ports is for inter-plane switching, and a third set of ports of the R ports is for in-plane add/drop. Note, the R ports does not necessarily mean that every degree has to have the same amount of ports, R. Stated differently, R can be a different value for different degrees. That is, in some implementations, R=20 for one degree whereas R=32 for another. Those skilled in the art will recognize various possibilities are contemplated.

S is greater than or equal to a sum of a number of degrees across all of the P switching planes. R is greater than or equal to a sum of the first set of ports, the second set of ports, and the third set of ports. The node can further include D directions, wherein at least one direction has multiple degrees, and D<$N_i$.

The degree components can include a route and select configuration with a first 1×R Wavelength Selective Switch (WSS) and a second R×1 WSS. The degree components can include a broadcast and select configuration with an R-way splitter and a R×1 Wavelength Selective Switch (WSS). The degree components can include a route and combine configuration with a 1×R Wavelength Selective Switch (WSS) and an R-way combiner. The node can further include one or more fiber shufflers configured to interconnect the P switching planes and the $N_i$ degrees. The degree components can include at least one open port for addition of a cross-plane switch for one or more of redundancy and additional inter-plane connectivity. The addition can be performable in-service.

In another embodiment, a node configured to operate in an optical network with Space Division Multiplexing includes P switching planes interconnected by an S×S cross-plane switch, P>1; D directions, wherein at least one direction has multiple degrees, and D<$N_i$; and $N_i$ degrees per switching plane $P_i$ where i=1 to P, each degree formed by corresponding degree components having R ports, wherein a first set of ports of the R ports is for intra-plane switching, a second set of ports of the R ports is for inter-plane switching, and a third set of ports of the R ports is for in-plane add/drop.

Note, the variables used herein, P switching planes, S×S cross-plane switch, D directions, R ports, $N_i$ degrees, i, etc. are positive integers.

Process

Figure 14:
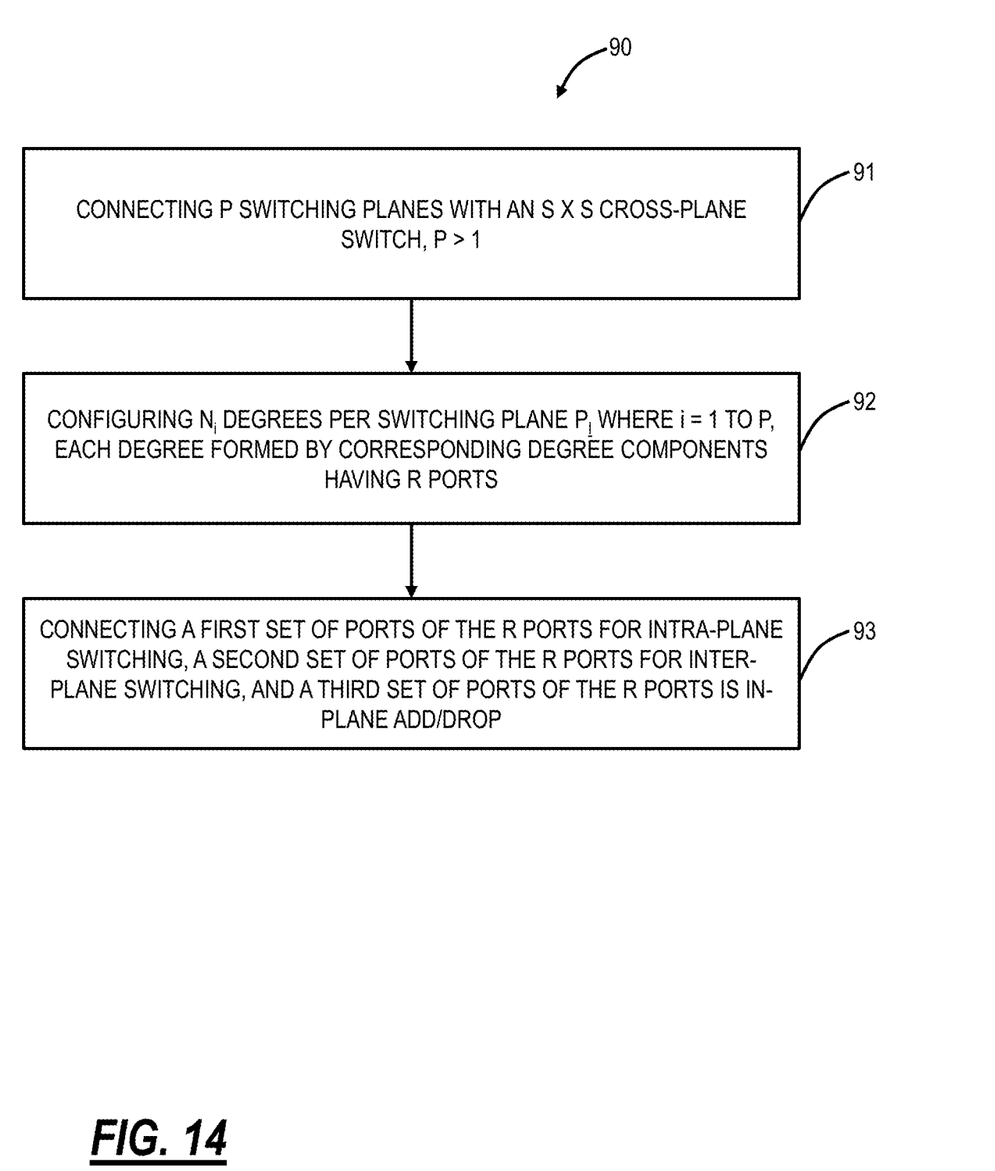
FIG. 14 is a flowchart of a process of implementing and operating a ROADM node.

FIG. 14 is a flowchart of a process 90 of implementing and operating a ROADM node 20. The process 90 includes connecting P switching planes with an S×S cross-plane switch, P>1 (step 91); configuring $N_i$ degrees per switching plane $P_i$ where i=1 to P, each degree formed by corresponding degree components having R ports (step 92); and connecting a first set of ports of the R ports for intra-plane switching, a second set of ports of the R ports for inter-plane switching, and a third set of ports of the R ports is in-plane add/drop (syep 93). S is greater than or equal to a sum of a number of degrees across all of the P switching planes. R is greater than or equal to a sum of the first set of ports, the second set of ports, and the third set of ports. The inter-plane switching connectivity via the S×S cross-plane switch can be upgraded as well as have redundancy added, in-service, as long as there is an open port on the degrees.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A Reconfigurable Optical Add/Drop Multiplexer (ROADM) node comprising:
P switching planes interconnected by an S×S cross-plane optical switch, P>1;
$N_i$ degrees per switching plane $P_i$ where i=1 to P, each degree formed by corresponding degree components having R ports for multiplexing or demultiplexing channels optically, wherein a first set of ports of the R ports is for intra-plane switching, a second set of ports of the R ports is for inter-plane switching, and a third set of ports of the R ports is for in-plane add/drop; and
one or more fiber shufflers configured to interconnect the P switching planes and the $N_i$ degrees.

2. The node of claim 1, wherein S is greater than or equal to a sum of a number of degrees across all of the P switching planes.

3. The node of claim 1, wherein R is greater than or equal to a sum of the first set of ports, the second set of ports, and the third set of ports.

4. The node of claim 1, further comprising
D directions, wherein at least one direction has multiple degrees, and D≤$N_i$.

5. The node of claim 1, wherein the degree components include a route and select configuration with a first 1×R Wavelength Selective Switch (WSS) and a second R×1 WSS.

6. The node of claim 1, wherein the degree components include a broadcast and select configuration with an R-way splitter and a R×1 Wavelength Selective Switch (WSS).

7. The node of claim 1, wherein the degree components include a route and combine configuration with a 1×R Wavelength Selective Switch (WSS) and an R-way combiner.

8. The node of claim 1, wherein the corresponding degree components include at least one open port for addition of a cross-plane switch for one or more of redundancy and additional inter-plane connectivity.

9. The node of claim 8, wherein the addition is performable in-service.

10. A Reconfigurable Optical Add/Drop Multiplexer (ROADM) node configured to operate in an optical network with Space Division Multiplexing, the node comprising: P switching planes interconnected by an S×S cross-plane optical switch, P>1; D directions, wherein at least one direction has multiple degrees, and D s Ni; and Ni degrees per switching plane Pi where i=1 to P, each degree formed by corresponding degree components having R ports for multiplexing or demultiplexing channels optically, wherein a first set of ports of the R ports is for intra-plane switching, a second set of ports of the R ports is for inter-plane switching, and a third set of ports of the R ports is for in-plane add/drop; one or more fiber shufflers configured to interconnect the P switching planes and the $N_i$ degrees.

11. The node of claim 10, wherein S is greater than or equal to a sum of a number of degrees across all of the P switching planes.

12. The node of claim 10, wherein R is greater than or equal to a sum of the first set of ports, the second set of ports, and the third set of ports.

13. The node of claim 10, wherein the degree components include a route and select configuration with a first 1×R Wavelength Selective Switch (WSS) and a second R×1 WSS.

14. The node of claim 10, wherein the degree components include a broadcast and select configuration with an R-way splitter and a R×1 Wavelength Selective Switch (WSS).

15. The node of claim 10, wherein the degree components include a route and combine configuration with a 1×R Wavelength Selective Switch (WSS) and an R-way combiner.

16. A Reconfigurable Optical Add/Drop Multiplexer (ROADM) node comprising:
P switching planes interconnected by an S×S cross-plane optical switch, P>1; and $N_i$ degrees per switching plane $P_i$ where i=1 to P, each degree formed by corresponding degree components having R ports for multiplexing or demultiplexing channels optically, wherein a first set of ports of the R ports is for intra-plane switching, a second set of ports of the R ports is for inter-plane switching, and a third set of ports of the R ports is for in-plane add/drop, wherein S is greater than or equal to a sum of a number of degrees across all of the P switching planes.

17. The node of claim 16, wherein R is greater than or equal to a sum of the first set of ports, the second set of ports, and the third set of ports.

18. The node of claim 16, further comprising

D directions, wherein at least one direction has multiple degrees, and $D \le N_i$.

19. The node of claim 16, wherein the corresponding degree components include at least one open port for addition of a cross-plane switch for one or more of redundancy and additional inter-plane connectivity.

20. The node of claim 16, further comprising one or more fiber shufflers configured to interconnect the P switching planes and the $N_i$ degrees.

\* \* \* \* \*

UNITED STATES PATENT AND TRADEMARK OFFICE
CERTIFICATE OF CORRECTION

| | |
|---|---|
| PATENT NO. | : 11,063,683 B1 |
| APPLICATION NO. | : 16/899739 |
| DATED | : July 13, 2021 |
| INVENTOR(S) | : Kevan Peter Jones and Loren Berg |

It is certified that error appears in the above-identified patent and that said Letters Patent is hereby corrected as shown below:

In the Claims

Column 14, Line 38, in Claim 10, should read:
direction has multiple degrees, and $D \leq N_i$; and $N_i$ degrees Signed and Sealed this
Twenty-seventh Day of June, 2023

Katherine Kelly Vidal
*Director of the United States Patent and Trademark Office*